US006238133B1

(12) United States Patent
DeRoche et al.

(10) Patent No.: US 6,238,133 B1
(45) Date of Patent: May 29, 2001

(54) ANTI-ROTATION MOUNTING MECHANISM FOR ROUND CUTTING INSERT

(75) Inventors: Kenneth G. DeRoche; Jeffrey E. Hartshorn, both of Greensburg, PA (US); Robert T. Snyder, Fuquay Varina, NC (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/175,985

(22) Filed: Oct. 20, 1998

(51) Int. Cl.⁷ ..................................... B25G 3/28
(52) U.S. Cl. .................. 403/359.1; 403/359.6; 403/359.5
(58) Field of Search ............... 403/359.1, 359.6, 403/359.5, 375, 383; 407/104, 64

(56) References Cited

U.S. PATENT DOCUMENTS

| | | | |
|---|---|---|---|
| 1,056,466 | * 3/1913 | Solem | 144/218 |
| 1,838,520 | * 12/1931 | Archer | 407/104 |
| 3,408,722 | 11/1968 | Berry, Jr. | 407/46 |
| 3,831,237 | * 8/1974 | Gunsalus | 29/105 R |
| 3,842,470 | * 10/1974 | Hertel | 29/98 |
| 3,946,474 | 3/1976 | Hahn et al. | 407/37 |
| 4,202,650 | * 5/1980 | Erickson | 407/46 |
| 4,632,593 | 12/1986 | Stashko | 403/316 |
| 5,147,158 | * 9/1992 | Riviere | 407/113 |
| 5,199,828 | * 4/1993 | Forsberg et al. | 407/104 |
| 5,346,336 | * 9/1994 | Rescigno | 407/104 |
| 5,558,142 | 9/1996 | Ehrle et al. | 144/230 |
| 5,658,100 | * 8/1997 | Deiss et al. | 407/35 |
| 6,053,671 | * 4/2000 | Stedt et al. | 407/35 |

FOREIGN PATENT DOCUMENTS

| | | |
|---|---|---|
| 29721160 | 2/1998 | (DE). |
| WO9700750 A1 | 1/1997 | (WO). |

OTHER PUBLICATIONS

International Search Report mailed Feb. 16, 2000 in counterpart PCT Application No. PCT/US99/23293.

* cited by examiner

Primary Examiner—Anthony Knight
Assistant Examiner—John B. Walsh
(74) Attorney, Agent, or Firm—Larry R. Meenan

(57) ABSTRACT

An anti-rotation mounting mechanism is provided between an indexable insert and an insert-receiving pocket in the body of a machine tool, such as a milling cutter. The mechanism includes a plurality of curved stop surfaces uniformly disposed around the side surface of the insert, a portion of which is obliquely oriented with respect to the side surface of the insert, and at least one anti-rotation surface in the pocket of the tool body having a shape substantially complementary to that of the stop surfaces for forming an interference joint between the pocket and the insert. Both the stop surfaces and the anti-rotation surface are substantially defined by partial radius curves such that either a broad, line-type or lenticular contact between the anti-rotation surface and the obliquely oriented portion of one of the stop surfaces is achieved. The mechanism effectively prevents rotation between the insert and pocket without the formation of point-type, localized stresses which can chip or break the insert.

17 Claims, 3 Drawing Sheets

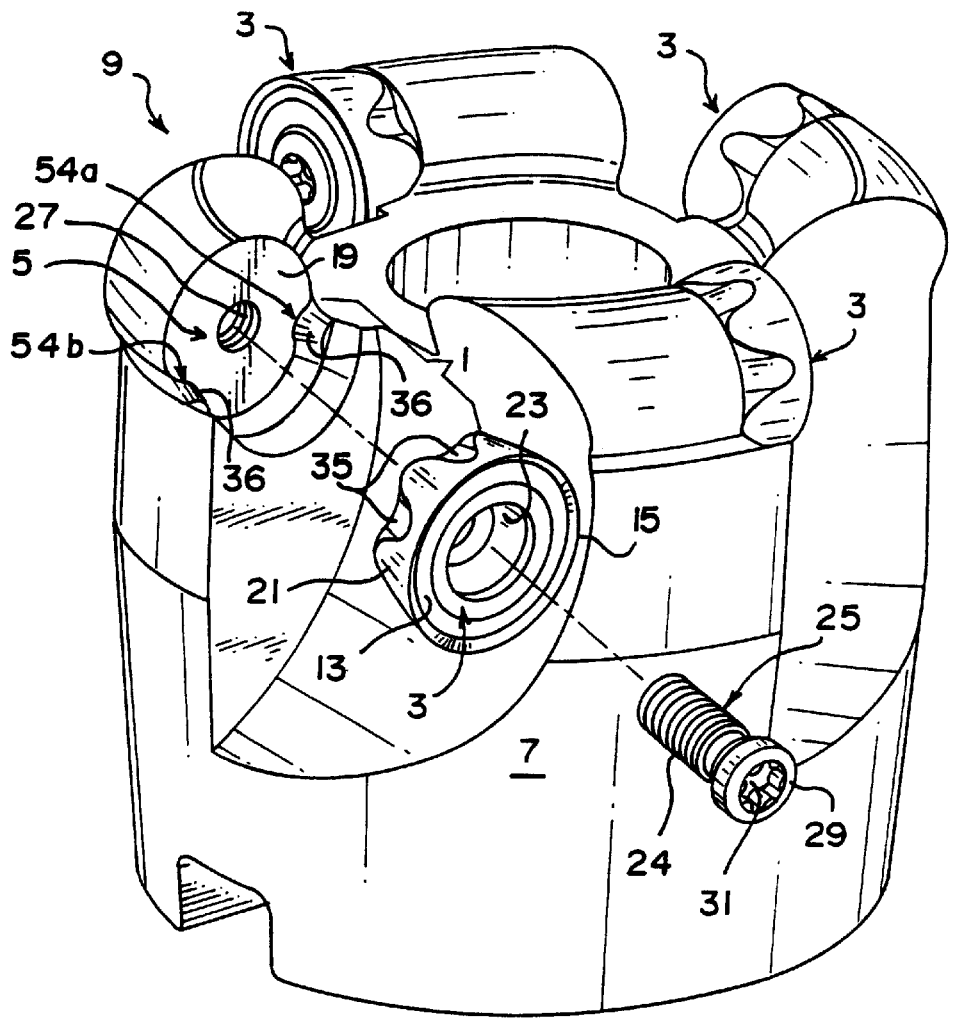
FIG. 1
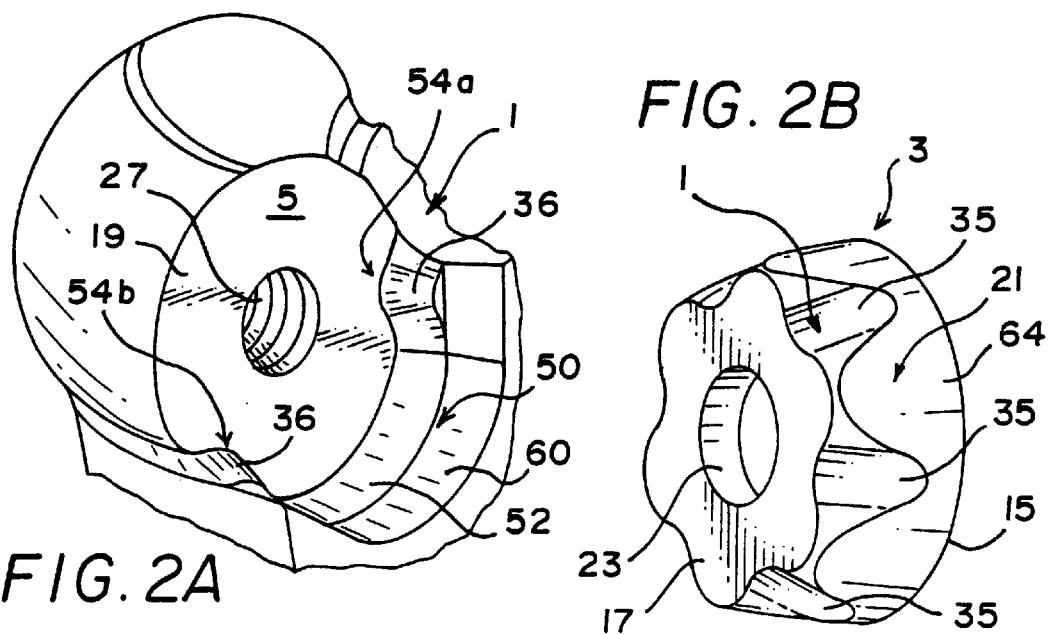
FIG. 2A
FIG. 2B

ANTI-ROTATION MOUNTING MECHANISM FOR ROUND CUTTING INSERT

BACKGROUND OF THE INVENTION

This invention generally relates to mounting mechanisms for cutting inserts, and is particularly concerned with a mechanism for preventing the rotation of a round cutting insert mounted onto the body of a cutting tool.

The inserts used in tools such as milling cutters are mounted in complementarily-shaped pockets spaced around the periphery of the tool body. The inserts are typically secured within their respective pockets by clamping screws inserted through a hole provided in the center of the insert. During a cutting operation, such inserts often experience not only compressive and vibratory forces, but some amount of torque due to the angle between the cutting edges of the inserts and the workpiece. For cutting inserts of non-round shapes, such torque does not result in the rotation of the insert due to the interference-type fit between the angled sidewalls of such inserts and the complementarily-shaped walls of the pocket that receive them. By contrast, round inserts can rotate within their respective pockets since no such mechanical interference naturally arises between the cylindrical or frustro-conical sidewalls of round inserts and the circular walls of the pockets which receive them. The resulting rotation can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

To prevent such unwanted rotation, several anti-rotation mechanisms have been developed in the prior art. In one such mechanism, a plurality of deep semicircular recesses are provided around the sidewall of the insert. A pin is provided adjacent to the sidewall of the insert-receiving pocket in the tool body that is complementary in shape to the recesses around the insert. In operation, the insert is installed in the pocket of the milling cutter or other tool with the pin of the pocket inserted into one of the semicircular recesses of the insert. During use, the insert is indexed to even out the wear on its cutting edges by periodically removing it from the pocket, partially rotating it, and reinstalling it so that the pin is received by a different recess. In another type of anti-rotation mechanism, a polygonal pattern of facets are provided around the circular sidewall of the insert. Such a mechanism is disclosed in U.S. Pat. No. 5,346,336. The insert-receiving pocket is provided with a complementarily-shaped pattern of polygonal walls for receiving the facets of the insert. The indexing of the insert is performed generally in the same manner as described in the first mechanism.

While both of these mechanisms effectively prevent the rotation of round inserts during a cutting operation, the inventors have noticed a number of shortcomings associated with each design. For example, the applicants have observed that, with respect to the first design, the edges of the full radius, semicircular recesses formed in the hard, carbide material of the insert can slowly cut the steel pin in the pocket as the result of vibrations between the pin and the edge of the recess, which is oriented substantially orthogonally with respect to the axis of the pin. Additionally, the provision of such deep recesses around the bottom of the insert body result in an undesirable weakening of the insert body as a result of the removal of the material necessary to form the recesses. The stop mechanism disclosed in the '336 patent likewise has shortcomings, albeit different ones. For example, the facets provided around the body of the insert are angled at a slightly steeper angle than the flat walls provided around the insert-receiving pockets to avoid contact between the walls of the pocket and the weaker, bottom portion of the insert. However, the limited contact provided by such a design can result in one-point contact between the edges of the insert facets and the flat walls of the pocket. Moreover, because the only contact between the insert and the pocket is along the upper portion of the insert, this relatively small area of the insert must absorb all the stresses generated between the insert and the pocket when the insert cuts a workpiece. Hence the limited and sometimes one-point contact between the insert and the pocket can result in localized chipping, cracking, or breakage of the insert over time.

Clearly, what is needed is a stop mechanism for round inserts which effectively prevents such inserts from rotating without creating local stresses in either the body of the insert or the pocket that receives it. Ideally, such a stop mechanism should be relatively easy to integrate into conventional insert and pocket structures. Finally, such a mechanism should be substantially independent from the main interface between the pocket walls and the insert that supports the insert during a cutting operation.

SUMMARY OF THE INVENTION

The invention is an anti-rotation mounting mechanism between an indexable insert in an insert-receiving pocket that overcomes all of the aforementioned shortcomings associated with the prior art. To this end, the invention comprises a plurality of curved stop surfaces disposed around the insert side surface, each of which includes a portion which is obliquely oriented with respect to the side surface of the insert, and at least one complementarily-shaped anti-rotation surface in the insert-receiving pocket. The anti-rotation surface in the pocket is preferably integrally formed with the pocket walls and both the anti-rotation surface and the stop surfaces of the are preferably defined by a gentle sloping, partial radius curve. A small amount of space is deliberately provided between the insert stop surfaces and the pocket anti-rotation surface to allow the insert to rotate between 1° and 10° before the stop and anti-rotation surfaces to seat against one another in broad line or lenticular surface contact.

In order to prevent the removal of a weakening amount of material from the insert, the rounded stop surfaces are tapered relative to the side surfaces of the insert; i. e., the stop surfaces increase in depth between the upper and lower surfaces of the insert such that sidewalls of the insert appears to be scalloped in a continuous sinusoidal pattern. Additionally, in order to equalize stresses between the insert walls and pocket walls, the pocket preferably includes two anti-rotation surfaces for simultaneously engaging two of the rounded stop surfaces of the insert. Finally, the anti-rotation surface is preferably located on a lower portion of the pocket sidewalls, and the upper portion of these sidewalls engages an upper portion of the insert sidewall to provide the primary support between the insert and the pocket.

The obliquely oriented, interfitting surfaces defined by the partial radius curves around the insert sidewalls and the sidewalls of the pocket provide an interference joint characterized by either a broad line-type or lenticular-surface type contact between the insert and the pocket in the tool body, avoiding localized point-type stresses which could either chip or crack the insert body or create wear patterns in the walls of the insert-receiving pocket. The contact between the upper sidewalls of the pocket and the insert substantially insulates the interference joint created by the stop and anti-rotation surfaces from the load applied between the insert and the pocket as a result of a cutting operation.

BRIEF DESCRIPTION OF THE SEVERAL FIGURES

FIG. 1 is a perspective, exploded view of a milling cutter incorporating the anti-rotation mounting mechanism of the invention;

FIGS. 2A and 2B are perspective views of both the insert-receiving pocket and the cutting insert used in the milling cutter of FIG. 1, illustrating the complementary anti-rotation surfaces that form the mechanism of the invention;

DETAILED DESCRIPTION OF THE PREFERRED EMBODIMENT

Figure 3:
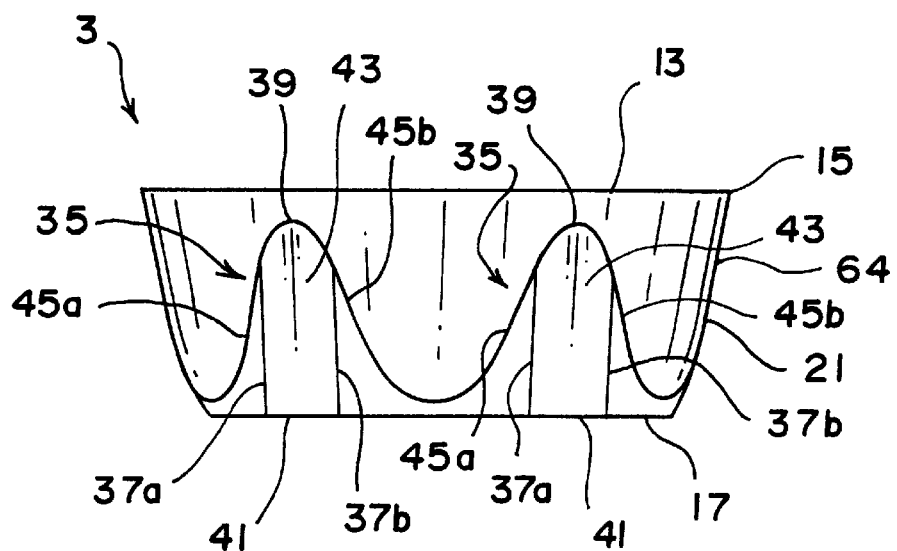
FIG. 3 is a side view of the insert illustrated in FIG. 2B illustrating the curved stop surfaces integrated around the sidewall of the insert.

With reference now to FIGS. 1, 2, and 3, wherein like numerals designate like components throughout all of the several Figures, the anti-rotation mounting mechanism 1 of the invention serves to prevent a round insert 3 from rotating within a pocket 5 present in the body 7 of a milling cutter 9 or other cutting tool. The insert 3 has an upper surface 13 that terminates in a circular cutting edge 15, and a bottom surface 17 that engages the floor 19 of the pocket 5 when the insert 3 is mounted onto the body 7 of the cutter 9. The insert 3 further has a frustro-conical sidewall 21 interconnecting the upper surface 13 and bottom surface 17. A screw hole 23 is centrally disposed through the body of the insert 3 for receiving the threaded shank of a clamping screw 25. The threaded shank 24 is screwed into a threaded bore 27 centrally located in the floor 19 of the pocket 5 in order to secure the insert 3 onto the body 7 of the milling cutter 9. To this end, the clamping screw 25 includes a screw head 29 with a wrench-receiving recess 31 as shown.

With reference now to FIGS. 2A, 2B, and 3, the mounting mechanism 1 of the invention generally comprises a plurality of curved stop surfaces 35 uniformly disposed around the frustro-conical sidewall 21 of the insert 3 in combination with mating anti-rotation surfaces 36 present in the sidewalls of the insert-receiving pocket 5. As will be described in more detail hereinafter, the inter-mating of the surfaces 35 and 36 creates interference-type joints between the insert 3 and the pocket 5 which effectively stop the insert from rotating within the pocket during a milling operation. The specific geometrical characteristics of the surfaces 35,36 will now be described in detail.

With specific reference to FIG. 3, each of the curved stop surfaces 35 in the sidewall 21 of the insert 3 includes a pair of mirror-symmetrical oblique engagement portions 37a,b for forming an interference-type joint with the substantially complementarily-curved anti-rotation surface 36. The upper and lower limits of each stop surface 35 is defined by a top end 39, and a bottom end 41. The central portion 43 of each stop surface 35 is gently tapered so that the depth of the stop surface 35 gently increases between the top and bottom ends 39,41. This particular characteristic of the stop surfaces 35 may best be seen with respect to FIG. 4. In the preferred embodiment, the angle of taper A is approximately 15°. Such tapering advantageously reduces the amount of material that must be removed from the body of the insert 3 in order to form the stop surfaces 35. Finally, each of the stop surfaces 35 is defined by side edges 45a,b formed by mirror-symmetrical S-type curves between top and bottom ends 39,41 of each surface 35. Due to the uniform sizing and angular spacing of the stop surfaces 35, a combination of the mirror-symmetrical S-curves forming the side edges 45a,b of the stop surfaces 35 creates a continuous sinusoidal curve around the circumference of the sidewall 21 of the insert 3.

Figure 4:
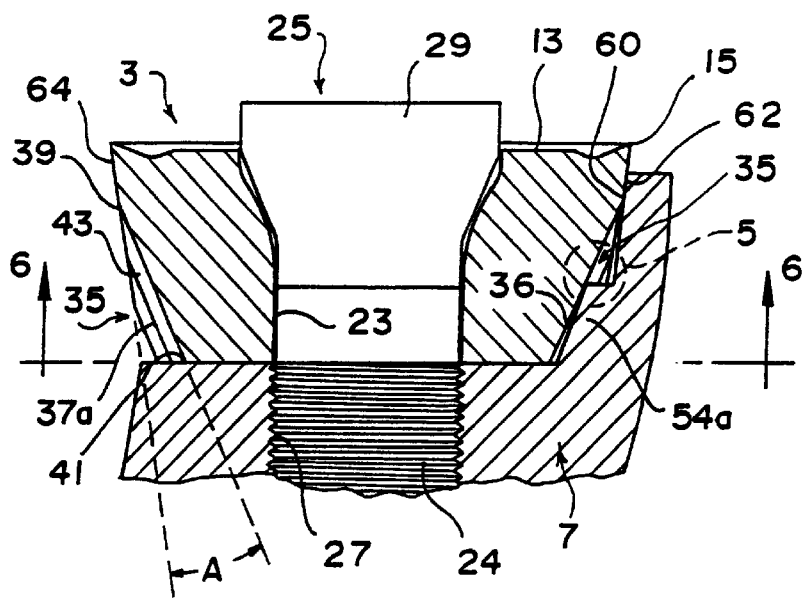
FIG. 4 is a cross-sectional side view of the insert of FIG. 3 mounted in an insert-receiving pocket of the milling cutter illustrated in FIG. 1.
Figure 5:
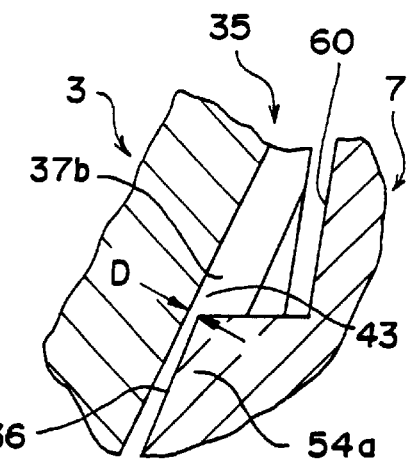
FIG. 5 is an enlarged view of the circled portion of FIG. 4, illustrating the spacing distance D deliberately left between the curved stop surfaces of the insert and the anti-rotation surfaces of the pocket so as to allow a small degree of relative rotation therebetween.
Figure 6:
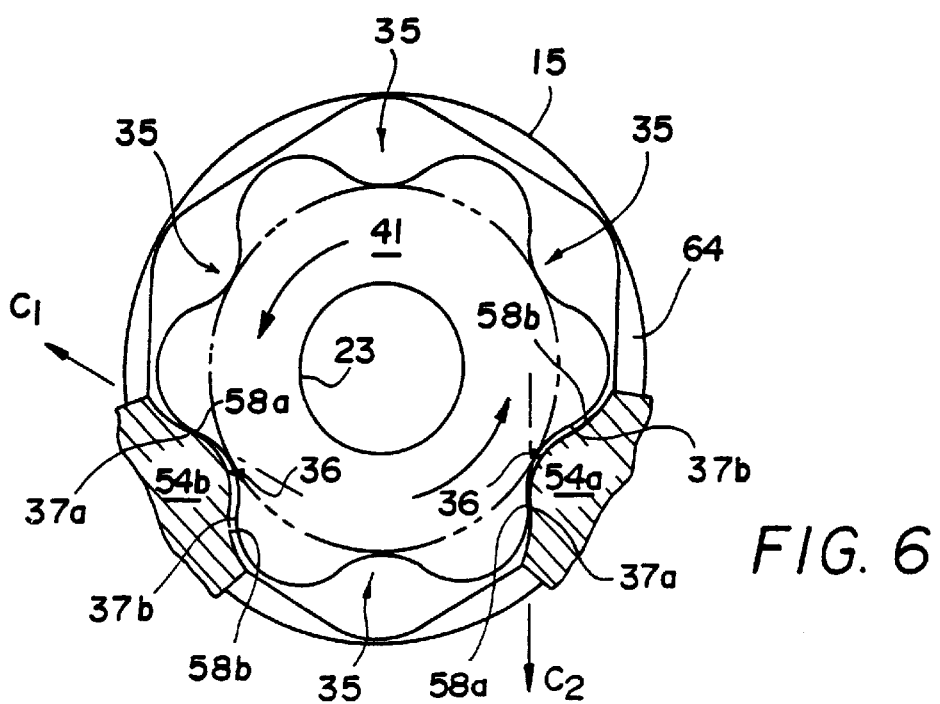
FIG. 6 is a bottom view of the mounted insert of FIG. 4 along the line 6—6.

With reference now to FIGS. 4, 5, and 6, the insert-receiving pocket 5 includes a side surface 50 having a lower portion 52 onto which a pair of opposing nibs 54a,b are integrally formed. The outer surface of the nibs 54a,b form the previously referred to anti-rotation surfaces 35 which mate with the curved stop surfaces 35 of the insert 3. Each anti-rotation surface 36 includes a pair of opposing engagement portions 58a,b specifically shown in FIG. 6 designed to engage portions 37a,b of the stop surfaces 35 of insert 3. The side surface 50 of the pocket 5 also includes an upper portion 60 indicated in FIGS. 4 and 5 for directly contacting the upper sidewall 64 of the insert 3. Such supporting contact between the upper portion 60 of pocket side surface 50 and upper sidewall 64 of the insert 3 is important for two reasons. First, the broad area of semicircular contact between the side surface 50 of the pocket 5 and the upper portion 60 of the insert sidewall 21 absorbs the majority of the transverse, vibratory loads that are applied to the insert 3 during a cutting operation which in turn insulates the anti-rotation mechanism 1 from such loads. Secondly, such an arrangement focuses the majority of such transverse vibrations onto the strongest part of the insert 3; i. e., the upper sidewall 64, where the diameter of the insert is maximized and where little or no material has been removed for the provision of the curved stop surfaces 35.

Figure 7:
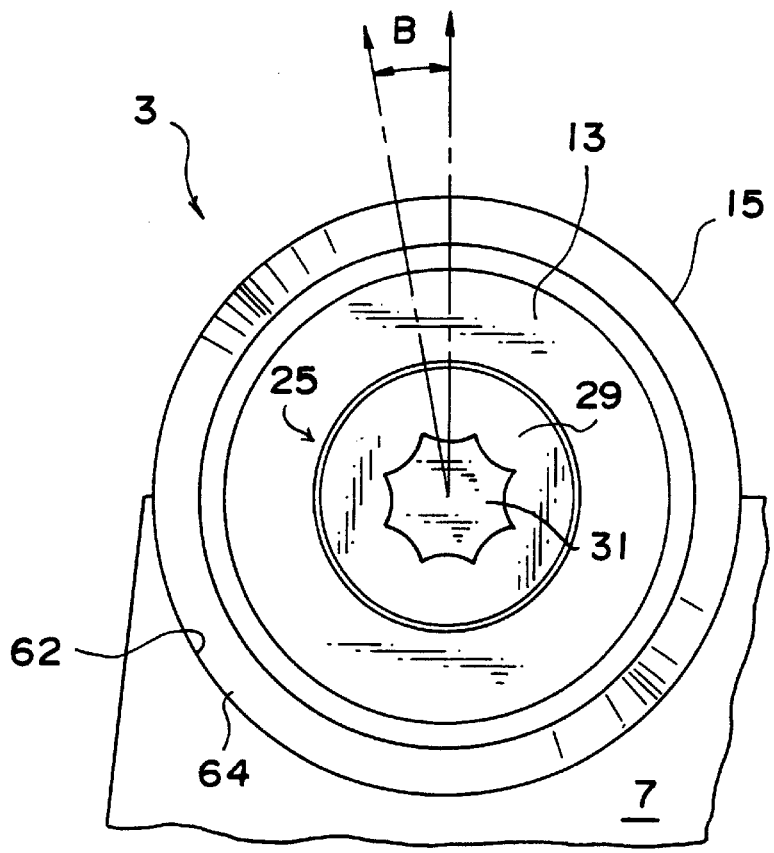
FIG. 7 is a top view of the mounted insert of FIG. 4.

The operation of the anti-rotation mechanism 1 may best be understood with respect to FIGS. 5, 6, and 7. While the curvature between the stop surfaces 35 of the insert 1 and the anti-rotation surface 36 is substantially complementary, the two surfaces are deliberately spaced apart a distance D which is typically a few thousandths of an inch (see in particular FIG. 5). Such a small gap between the two surfaces 35,36 allows the insert 3 to rotate an angle B of between 1° and 10° after the insert 3 has been clamped into the pocket 5 via screw 25. Such a small latitude of rotational movement allows one of the oblique engagement portions 37a,b of the stop surfaces 35 to come into contact with one of the engagement portions 58a,b of the anti-rotation surface 36, as is illustrated in FIG. 6. In the context of this application, the previously mentioned "oblique" contact refers to the fact that a line $C_1$, $C_2$ drawn tangent to the engagement portions 37a, 58a traverses the outer circumference of the circular insert 15 at an angle which is non-orthogonal to the outer circumference of the circular insert 3. The relatively gently sloping, large partial radius curves that define the stop surfaces 35 and anti-rotation surfaces 36 advantageously results in broad line or lenticular contact between the insert 3 and the nibs 54a,b. The oblique orientation of this contact along lines $C_1$ and $C_2$ tends to dissipate the contact forces that occur between the engagement portions 37a,b and 58a,b of the stop surfaces 35 and anti-rotation surface 36 radially toward the lower portion 52 of the pocket side surface 50 so that the nibs 54a,b do not tend to be sheared or worn off over time. The absorption of most of the transverse vibratory load between the insert 3 and the pocket 5 at the contact interface 62 between the insert upper sidewall 64 and the upper portion 60 of the pocket side surface 50, in combination with the broad and oblique contact between the engagement portions 37a and 58a of the insert 3 and pocket 5, results in an anti-rotation mechanism 1 which not only prevents the insert from cracking or chipping due to point type stresses induced therein during a cutting operation, but which further reduces wear between the nibs 54a,b of the insert pocket 7, and the hard carbide material which forms the insert 3.

While this invention has been described with respect to a preferred embodiment, different modifications, variations, and additions will become evident to persons of ordinary skill in the art. For example, while the anti-rotation mechanism 1 has been described with respect to an insert having a circular cutting edge, it can also be applied to inserts having curved non-circular cutting edges, or even inserts having straight cutting edges. Additionally, while the preferred embodiment includes a pair of opposing nibs 54a,b in the insert pocket 5, either a greater number of nibs or even only a single nib could still be used to implement the invention. While the nibs 54a,b are preferably integrally formed into the side surface 50 of the pocket 5, they could also be separately installed if one wished to retrofit the invention onto an existing milling cutter or tool. All such variations, additions, and modifications are intended to be encompassed within the scope of this application, which is limited only by the claims appended hereto.

What is claimed is:

1. An anti-rotation mounting mechanism between an indexable insert and an insert-receiving pocket in a tool body, said insert including an upper surface that terminates in a cutting edge, a lower surface, and a circular side surface between said upper and lower surfaces, comprising:
   a plurality of curved stop surfaces disposed around an insert side surface; and
   at least one anti-rotation surface in a pocket of said tool body for engaging said stop surfaces to form an interference joint,
   wherein both said stop surfaces and anti-rotation surface are substantially defined by a partial radius curve, such that said stop surfaces and said anti-rotation surface engage in at least broad line contact in forming said interference joint.

2. The anti-rotation mounting mechanism of claim 1, wherein said cutting edge of said insert is rounded.

3. The anti-rotation mounting mechanism of claim 1, wherein a portion of said curved stop surfaces is obliquely oriented with respect to said side surface of said insert, and said anti-rotation surface engages said obliquely oriented portion.

4. The anti-rotation mounting mechanism of claim 3, wherein said anti-rotation surface is an integral part of a lower side surface of said pocket, and said pocket includes an upper side surface for engaging and supporting said insert side surface.

5. The anti-rotation mounting mechanism of claim 1, wherein said curved stop surfaces are concave, and said anti-rotation surface is convex.

6. The anti-rotation mounting mechanism of claim 5, wherein said curved stop surfaces are equidistantly disposed around the insert side surface.

7. The anti-rotation mounting mechanism of claim 1, wherein said side surface of said insert includes a sinusoidal profile that defines said stop surfaces.

8. The anti-rotation mounting mechanism of claim 1, wherein said anti-rotation surface is substantially complementary in shape to each of said curved stop surfaces.

9. The anti-rotation mounting mechanism of claim 7, comprising at least two anti-rotation surfaces spaced apart in said insert-receiving pocket for engaging two different stop surfaces of said insert.

10. An anti-rotation mounting mechanism between an indexable insert and an insert-receiving pocket in a tool body, said insert including an upper surface that terminates in a rounded cutting edge, a lower surface, and a side surface between said upper and lower surfaces, comprising:
    a plurality of curved stop surfaces disposed around said insert side surface, a portion of which is obliquely oriented with respect to said side surface of said insert; and
    at least one anti-rotation surface in a sidewall of said pocket of said tool body for engaging said obliquely oriented portion of said stop surfaces and forming an interference joint, said anti-rotation surface being substantially complementary in shape to said curve of said stop surfaces, and engaging said stop surface in at least broad line contact.

11. The anti-rotation mounting mechanism of claim 10, wherein said anti-rotation surface is integrally formed in a lower sidewall of said pocket, and wherein said pocket includes an upper side surface for engaging and supporting said insert side surface.

12. The anti-rotation mounting mechanism of claim 10, wherein said curved stop surfaces are concave and said anti-rotation surfaces is convex, and said stop surfaces and anti-rotation surface are substantially defined by a partial-radius curve.

13. The anti-rotation mounting mechanism of claim 12, wherein each of said partial radius curves of said curved stop surfaces is in turn defined by a pair of symmetrical S-shaped curves.

14. The anti-rotation mounting mechanism of claim 10, wherein said curved stop surfaces increase in depth between said upper and lower surface of said insert.

15. The anti-rotation mounting mechanism of claim 10, wherein said side surface of said insert includes a sinusoidal profile that defines said stop surfaces.

16. The anti-rotation mounting mechanism of claim 10, comprising at least two anti-rotation surfaces spaced apart in said insert-receiving pocket.

17. The anti-rotation mounting mechanism of claim 10, wherein said stop surfaces and anti-rotation surfaces are spaced apart a distance that allows said insert to rotate in a tool body pocket between about 1° and 10° before contact occurs between them, and wherein said contact is lenticular in shape.

* * * * *